US006741695B1

(12) United States Patent
McConnell et al.

(10) Patent No.: US 6,741,695 B1
(45) Date of Patent: May 25, 2004

(54) METHOD AND SYSTEM FOR INTERFACING A LEGACY CIRCUIT-SWITCHED NETWORK WITH A PACKET-SWITCHED NETWORK (75) Inventors: Von McConnell, Leawood, KS (US); Wen Xue, Overland Park, KS (US); Baoquan Zhang, Overland Park, KS (US); Jesse Money, Shawnee, KS (US)

(73) Assignee: Sprint Spectrum, L.P., Overland Park, KS (US)

( * ) Notice: Subject to any disclaimer, the term of this patent is extended or adjusted under 35 U.S.C. 154(b) by 30 days.

(21) Appl. No.: 10/115,341

(22) Filed: Apr. 3, 2002

(51) Int. Cl.[7] .................................................. H04M 7/00
(52) U.S. Cl. .................. 379/229; 379/221.09; 370/356; 370/352
(58) Field of Search .......................... 379/201.02, 201.05, 379/201.12, 88.17, 221.09, 229; 370/356, 354, 352

(56) References Cited

U.S. PATENT DOCUMENTS

| 5,610,969 | A | * | 3/1997 | McHenry et al. ............. 379/56 |
| 5,793,762 | A | * | 8/1998 | Penners et al. ............. 370/389 |
| 6,359,880 | B1 | * | 3/2002 | Curry et al. ................. 370/352 |
| 6,463,055 | B1 | * | 10/2002 | Lupien et al. ............... 370/353 |
| 6,614,784 | B1 | * | 9/2003 | Glitho et al. ................ 370/352 |

FOREIGN PATENT DOCUMENTS

| EP | 1003343 A1 | 7/1999 |
| WO | WO 00/74409 | 12/2000 |

OTHER PUBLICATIONS

Dynamicsoft, "NTT Communicationware Introduces Service Control Point, Enabling Customers to Develop Applications Over Several Types of Networks", Oct. 12, 1999, 1–3 pages.

"Dynamicsoft SIP Proxy Server Version 5.1", 2001, 1–4 pages.
Steve Donovan, et al., "A Functional Description of a SIP–PSTN Gateway", Internet Draft, Nov. 15, 1998, 1–5 pages.
Eric Zimmer, et al., "SIP Best Current Practice for Telephony Interworking", Internet Draft, Oct. 1999, pp. 1–8.
H. Schulzrinne, et al., "Interworking between SIP and INAP", Internet Draft, Jul. 2000, 1–6 pages.
S. Donovan, "The SIP INFO Method", Request for Comments 2976, Oct. 2000, 1–7 pages.
Vijay Gurbani, "SIP Enabled IN Services—an Implementation Report", Internet Draft, Nov. 10, 2000, 1–8 pages.
D. Lebovits, "SIP/IN Networking", Internet Draft, Jun. 2000, 1–8 pages.
F. Haerens, "SIP–IN Interworking Protocol Architecture and Procedures", Internet Draft, Feb. 2001, 1–24 pages.
Jon Peterson, et al., "Mapping of ISUP Parameters to SIP Headers in SIP–T", Internet Draft Feb. 2001, 1–8 pages.
Aparna Vemuri, "SIP for Telephone (SIP–T): Context and Architectures", Internet Draft, Feb. 2001, 1–16 pages.
Gonzalo Camarillo, et al., "ISUP to SIP Mapping", Internet Draft, May 2001, 1–37 pages.

(List continued on next page.)

Primary Examiner—Creighton Smith (57) ABSTRACT

An interface engine that is communicatively connected to a packet-switched network and to a legacy circuit-switched network uses a call processing protocol, such as the session initiation protocol (SIP), for packet-switched network communications and uses a legacy signaling protocol, such as IS-41, for legacy circuit-switched communications. In response to a registration request initiated by a subscriber device on the packet-switched network, the interface engine obtains a service profile for the subscriber from a call processing system, such as a home location register (HLR), of the legacy circuit-switched network. Service parameters derived from the service profile and stored in a service database may be used to apply services on the packet-switched network for the subscriber device.

23 Claims, 9 Drawing Sheets

OTHER PUBLICATIONS

Conzalo Camarillo, et al., "Mapping of ISUP Overlap Signalling to SIP", Internet Draft, May 2001, 1–7 Pages.

Vijay K. Gurbani, "Accessing IN services from SIP networks", Internet Draft, Aug. 2001, pp. 1–15.

M. Handley, H. Sachulzrinne, E. Schooler, J. Rosenberg, "SIP: Session Initiation Protocol", RFC 2543, Mar., 1999, pp. 1–108.

Alan Johnston, Steve Donovan, Robert Sparks, Chris Cunningham, Kevin Summers, Dean Willis, Jonathan Rosenberg, Henning Schulzrinne, "SIP Telephony Call Flow Examples", Internet Draft, Mar. 2000, pp. 1–268.

Henry Sinnreich, Alan B. Johnston, "Internet Communications Using SIP" 2001, pp. 127–149, 187–200, 247–263.

* cited by examiner

METHOD AND SYSTEM FOR INTERFACING A LEGACY CIRCUIT-SWITCHED NETWORK WITH A PACKET-SWITCHED NETWORK

BACKGROUND OF THE INVENTION

1. Field of the Invention

The present invention relates to communications networks, and more specifically, to a method and system for interfacing a legacy circuit-switched network with a packet-switched network.

2. Description of Related Art

Packet-switched networks, such as the Internet, are increasingly being used to carry traffic, such as voice calls, that have traditionally used circuit-switched networks, such as the public switched telephone network (PSTN). The shift is being motivated by a number of different factors. For example, packet-switched networks may allow voice traffic to be integrated with data, video, and other traffic. Packet-switched networks are typically less expensive to build and maintain than circuit-switched networks. Packet-switched network also often have higher bandwidths than what is available in most circuit-switched networks.

To accommodate voice traffic over packet-switched networks, which is often referred to as voice over Internet Protocol ("VoIP") or Internet telephony, a number of different call processing protocols, i.e., procedures for connecting a calling party to one or more called parties, have been developed. Such call processing protocols include H.323, the Media Gateway Control Protocol (MGCP), Megaco, and the Session Initiation Protocol (SIP).

One challenge with using such call processing protocols is being able to integrate them with legacy circuit-switched networks. This integration is important because packet-switched networks are likely to co-exist with legacy circuit-switched networks for quite some time. One goal of such integration is to provide similar telecommunications services to subscribers, regardless of whether the subscribers are using a legacy circuit-switched network or a packet-switched network. For example, if a subscriber has enhanced telephony services, such as call forwarding, call waiting, and/or call screening, available to him or her on a legacy circuit-switched network, it would be advantageous to make similar enhanced services available to the subscriber when operating on packet-switched networks.

To achieve this, the packet-switched network should have access to: (1) the subscriber's service profile, which specifies the services to which her or she subscribes and any parameters for the services; and (2) the service logic, which specifies how to provide the service based on the parameters in the service profile. The second requirement may be fulfilled by programming the service logic into one or more servers or other network elements that provide the services in the packet-switched network. Thus, the service logic used to provide a service in a packet-switched network may be different than the service logic used to provide the comparable service in the legacy circuit-switched network. Alternatively, servers in the packet-switched network may execute existing service logic in the legacy circuit-switched network to provide services in the packet-switched network. This may be achieved through the use of internetwork queries and mediated service logic, such as described in U.S. patent application Ser. No. 09/410,869, filed Oct. 1, 1999, which is fully incorporated herein by reference.

With respect to the first requirement, however, service profile information may be maintained in a database, such as a service control point (SCP) or home location register (HLR), that is part of the legacy circuit-switched network. Thus, it is desirable for the servers or other network elements that execute the service logic in the packet-switched network to have access to the service profile information maintained in the legacy circuit-switched network and to use the service profile information to provide services to subscribers using the packet-switched network.

SUMMARY OF THE INVENTION

In a first principal aspect, exemplary embodiments of the present invention provide a method of interfacing a circuit-switched network with a packet-switched network. In accordance with the method, a registration message indicating a subscriber is connected to said packet-switched network is received. In response to this registration message, a request message is sent to a call control system of the circuit-switched network. The request message identifies the subscriber. A response message is received from the call control system. The response message includes service profile information for the subscriber. At least one service parameter derived from the service profile information is stored in a service database of the packet-switched network.

In a second principal aspect, exemplary embodiments of the present invention provide a method of interfacing a legacy network with a Session Initiation Protocol (SIP) network. In accordance with the method, a registration message indicating presence of a subscriber in a SIP network is received. In response to the registration message, a request message is sent to a call control system of said network. The request message identifies the subscriber. A response message is received from the call control system. The response message includes service profile information for the subscriber. At least one service parameter derived from the service profile information is stored in a SIP service database.

In a third principal aspect, exemplary embodiments of the present invention provide a system for interfacing a circuit-switched network that includes a call control system with a packet-switched network. This system comprises an interface engine that sends a request message to a call control system of the circuit-switched network, in response to a registration message. The request message identifies the subscriber, and the registration message indicates a subscriber is connected to the packet-switched network.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

In its preferred embodiments, the present invention provides a method and system for interfacing a legacy circuit-switched network with a packet-switched network. The legacy circuit-switched network may be a wireless network, a land-based network, or it may include both. In addition, the legacy circuit-switched network may be a public network, such as a public wireless network, or it may be a private network, such as may be based on a private branch exchange (PBX). In typical embodiments, the packet-switched network is a wide area network (WAN), such as the Internet. However, in other embodiments, the packet-switched network may be a local area network (LAN).

In typical embodiments, the packet-switched network uses a call processing protocol, such as H.323, the Media Gateway Control Protocol (MGCP), Megaco, the Session Initiation Protocol (SLP), or some other call processing protocol. For purposes of illustrating exemplary embodiments, the present invention is described herein with reference to SIP. Accordingly, the following documents describing aspects of SIP are fully incorporated herein by reference: (1) "SIP: Session Initiation Protocol," RFC 2543 (March 1999); and (2) "SIP Telephony Call Flow Examples," Internet Draft of the Internet Engineering Task Force (March 2000).

In typical embodiments, the legacy circuit-switched network uses a signaling system, such as SS7, and may also use other signaling systems. For example, most wireless networks in the United States use one of the revisions of TIA/EIA Interim Standard 41 ("IS-41"), which is typically run as an application on SS7. For purposes of illustrating exemplary embodiments, the present invention is described herein with reference to IS-41 signaling. Accordingly, a recent revision of the IS-41 interim standards, ANSI-41 Rev. D, published July 1997, is fully incorporated herein by reference. Extensions to ANSI-41D for wireless intelligent network ("WIN") triggers and WIN call processing are specified in Interim Standard IS-771, published July 1999, and in Interim Standard IS-848, published October 2000, which documents are fully incorporated herein by reference.

1. Exemplary Architecture

Figure 1:
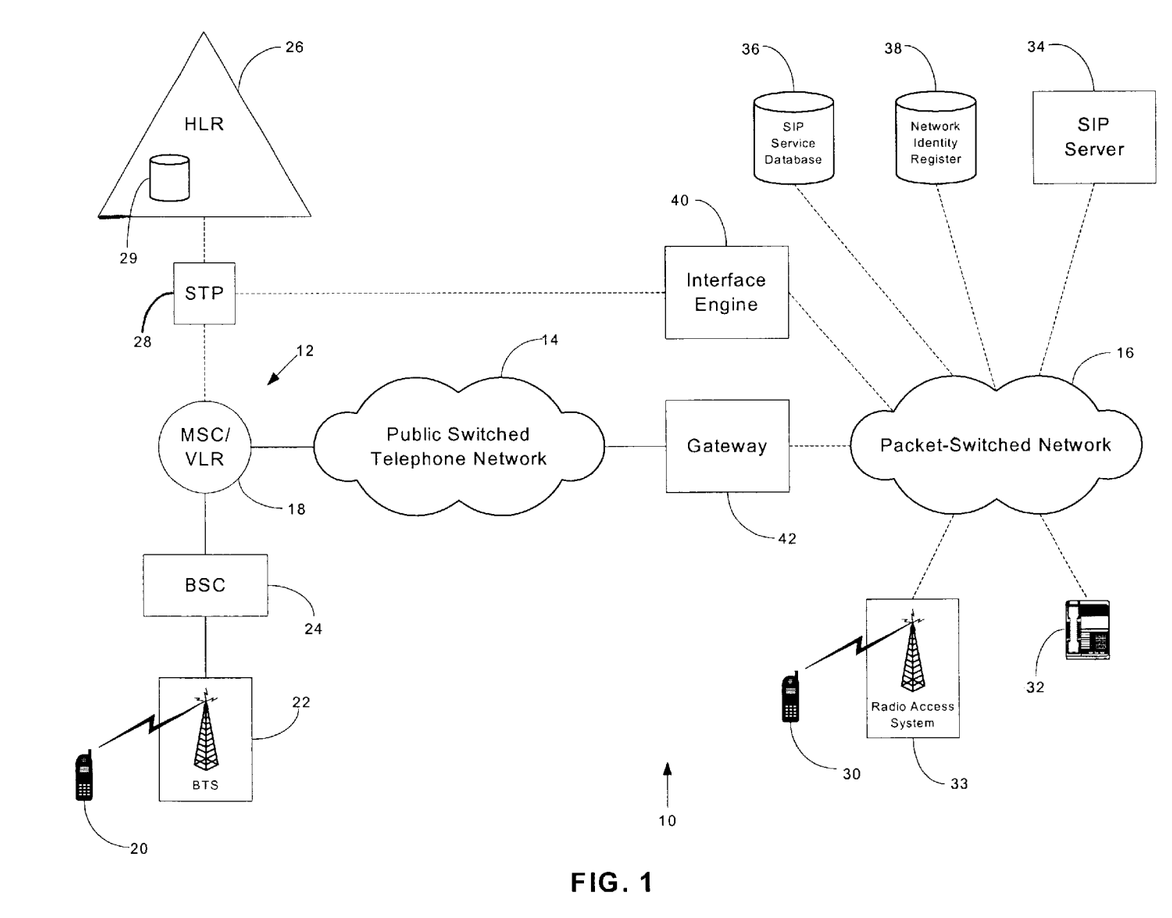
FIG. 1 is a simplified block diagram that illustrates a telecommunications network in which an exemplary embodiment of the present invention can be implemented.

Referring to the drawings, FIG. 1 illustrates a simplified diagram of a network 10 in which an exemplary embodiment of the present invention may be employed. As shown in FIG. 1, network 10 includes a legacy circuit-switched network 12, which is connected to public switched telephone network (PSTN) 14, and further includes a packet-switched network 16, such as the Internet. In the exemplary embodiment shown in FIG. 1, legacy circuit-switched network 12 is a public wireless network. However, in other embodiments, network 12 may be a private network, a land-based network (and may be part of PSTN 14) or other circuit-switched network.

As a public wireless network, network 12 includes an MSC/VLR 18 connected to PSTN 14. In embodiments wherein network 12 is other than a public wireless network, network 12 may instead include a service switching point (SSP), a private branch exchange (PBX), a wireless PBX, or other type of switching system.

As a public wireless network, network 12 also typically includes other components to provide wireless access to mobile stations, such as mobile station 20. For example, as shown in FIG. 1, network 12 may include a base transceiver station (BTS) 22 that provides a wireless coverage area, within which mobile stations, such as mobile station 20, may wirelessly communicate with network 12. Network 12 may also include a base station controller (BSC) 24 connected to BTS 22 and to MSC/VLR 18.

MSC/VLR 18 is controlled by a call control system 26 via a signaling link that may include one or more signal transfer points (STPs), such as STP 28. Call control system 26 typically functions as a home location register (HLR) for network 12, where network 12 is a public wireless network. Alternatively, or additionally, call control system 26 may function as a service control point (SCP). More particularly, call control system 26 may be a WIN SCP that controls calls based on WIN triggers. For example, call control system 26 may be a Telcordia SCP. Call control system 26 has access to a database 29 containing subscriber service profiles. Database 29 may be located in call control system 26, as shown in FIG. 1, or it may be located in a separate platform.

Packet-switched network 16 is in communication with a plurality of subscriber devices, such as subscriber devices 30 and 32. Subscriber devices 30 and 32 may be highly mobile devices, such as wireless telephones or personal digital assistants (PDAs), or relatively fixed devices, such as digital telephones, desktop personal computers, or video terminals. To allow communication with subscriber devices that are mobile, packet-switched network 16 may be connected to a radio access system 33. Radio access system 33 provides a wireless coverage area, within which subscriber devices, such as subscriber device 30, may wirelessly communicate with packet-switched network 16.

Subscriber devices 30 and 32 are able to run or access user agent applications to allow communication with each other via packet-switched network 16 using the Session Initiation Protocol (SIP). During a SIP session, subscriber devices 30 and 32 may exchange data, voice, video, or other media. For example, subscriber devices 30 and 32 may be participants in a voice call transmitted over packet-switched network 16, e.g., Internet telephony or VoIP.

In accordance with the SIP protocol, one or more SIP servers, such as SIP server 34, are connected to packet-switched network 16. An example of a suitable SIP server is the DynamicSoft SIP server, available from DynamicSoft, Inc. Typically, one or more SIP service databases, such as SIP service database 36, are also connected to packet-switched network 16. Alternatively, SIP service database 36 may be located in SIP server 30. A network identity register 38 may also be connected to packet-switched network 16.

SIP server 34 sets up and controls sessions through packet-switched network 16 between subscriber devices, such as subscriber devices 30 and 32. SIP server 34 is also able to query SIP service database 36 to obtain information that it can use when setting up and controlling SIP sessions between subscriber devices.

Call control system 26 is connected to packet-switched network 16 via an interface engine 40. Interface engine 40 is an application that mediates communications between call control system 26 and SIP servers, such as SIP server 34, via packet-switched network 16. Interface engine 40 may also communicate with SIP service database 36 and network identity register 38 via packet-switched network 16. As described in more detail below, interface engine 40 communicates with SIP server 34 and SIP service database 36 using the SIP protocol, and it acts as a SIP proxy server in such communication. However, interface engine 40 communicates with call control system 26, such as via STP 28, using IS-41. As described in more detail below, interface engine 40 may act, in certain respects, like a MSC/VLR in such communication. Interface engine 40 may be realized by appropriately programming a platform that has SIP proxy functionality, such as a Telcordia SCP.

Network 10 may also include a gateway 42 connected to public switched telephone network 14 and to packet-switched network 16. Gateway 42 converts between the data packet format used in packet network 16 and the circuit-switched format used in PSTN 14.

Figure 2:
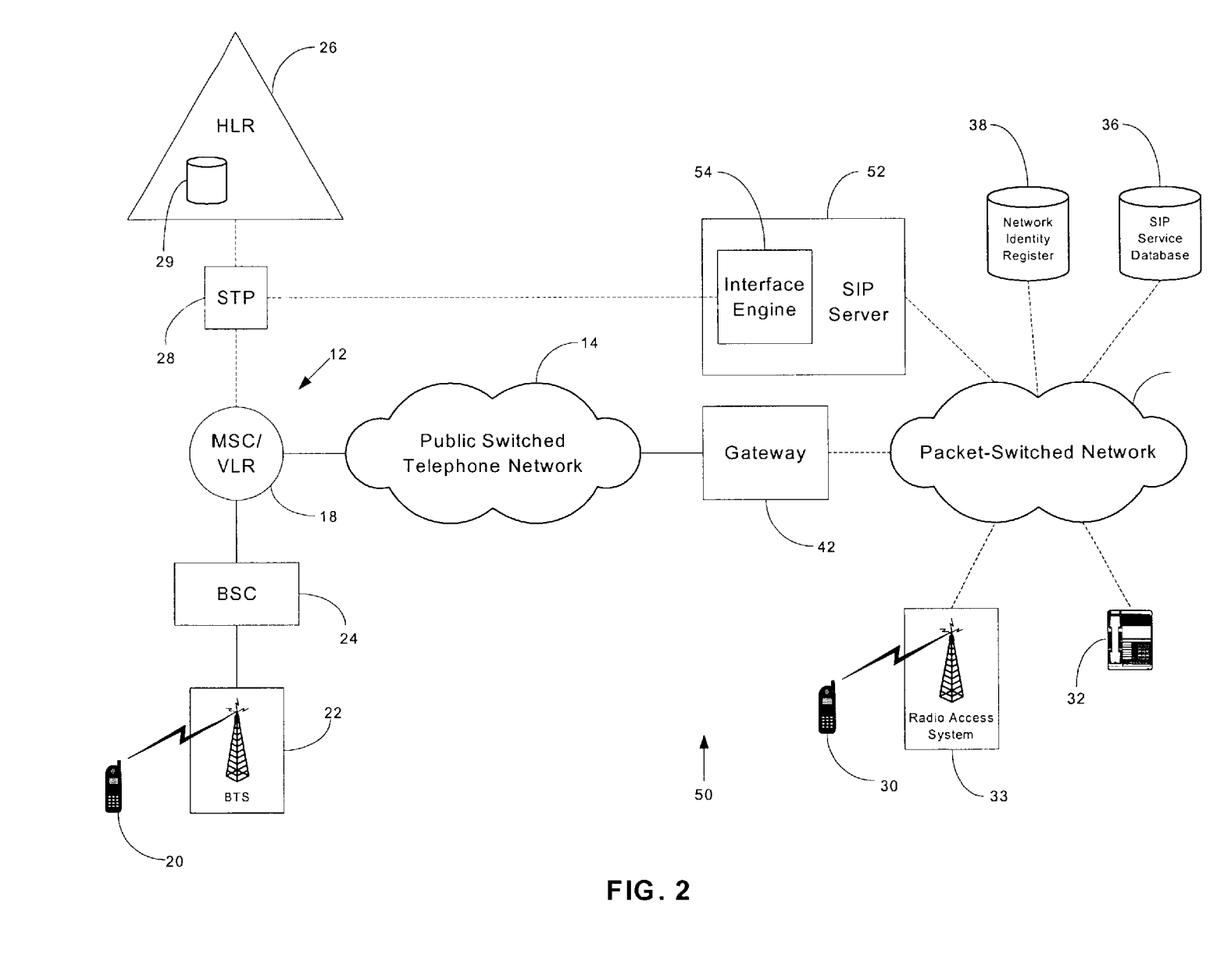
FIG. 2 is a simplified block diagram that illustrates a telecommunications network in which an exemplary embodiment of the present invention can be implemented.

FIG. 2 shows an alternative embodiment, in which the interface engine is an application run on the SIP server, instead of a separate platform. Thus, FIG. 2 illustrates a simplified diagram of a network 50 in which another exemplary embodiment of the present invention may be employed. Network 50 is similar to network 10 shown in FIG. 1, except that it includes an enhanced SIP 52 connected to packet-switched network 16. Enhanced SIP server 52 sets up and controls calls through packet-switched network 16 between subscriber devices 30 and 32, using the SIP protocol. Enhanced SIP server 52 may also query SIP service database 36 and network identity register 38 to provide services for such calls.

Running on enhanced SIP server 52 as an application is an interface engine 54, which is communicatively connected to call control system 26, such as via STP 28. In this way, enhanced SIP server 52 communicates with subscriber devices 30 and 32 using the SEP protocol, but it uses interface engine 54 to communicate with call control system 26 using a legacy signaling system, such as IS-41.

Figure 3:
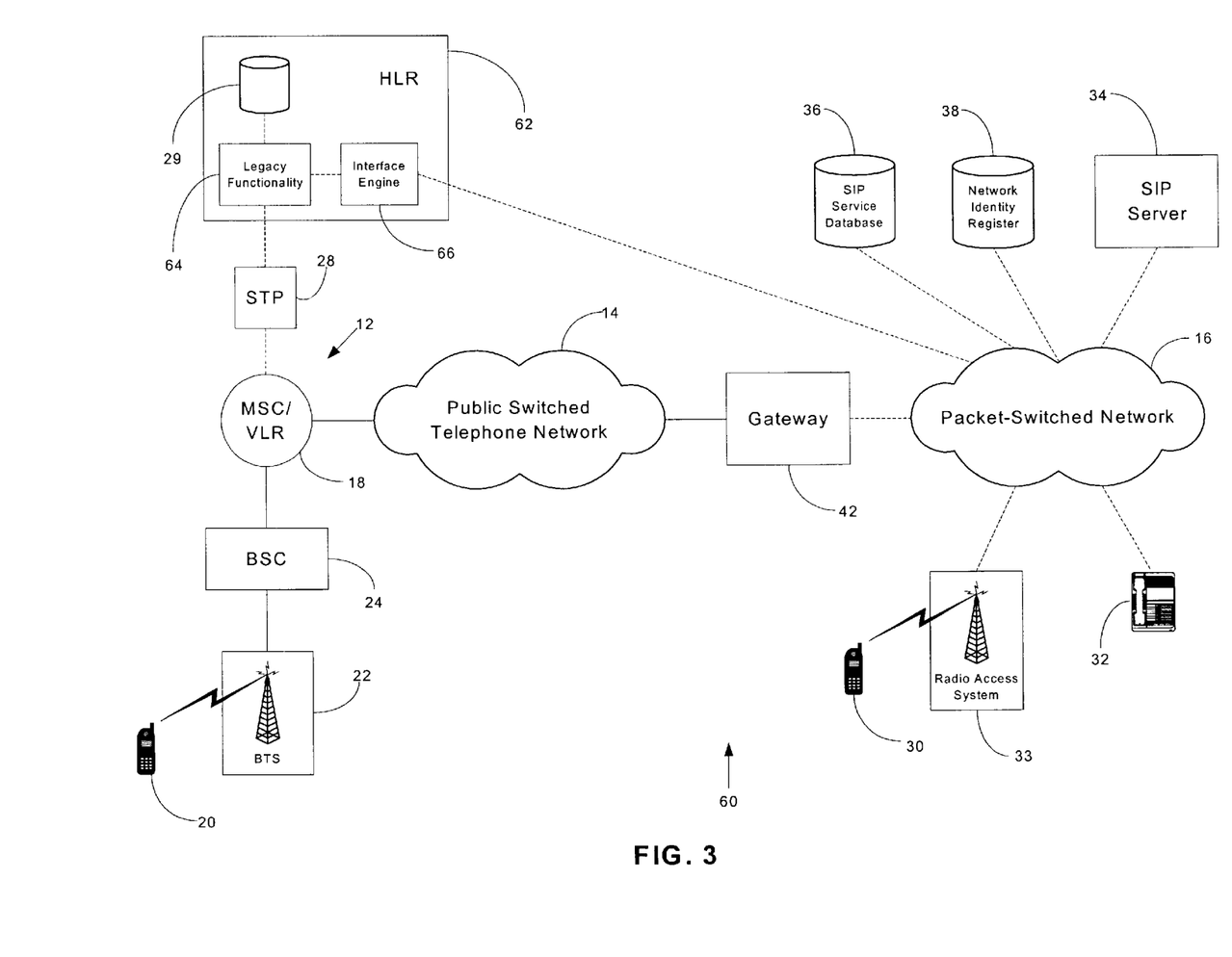
FIG. 3 is a simplified block diagram that illustrates a telecommunications network in which an exemplary embodiment of the present invention can be implemented.

FIG. 3 shows another alternative embodiment, in which the interface engine is an application run on an enhanced call control system. Thus, FIG. 3 illustrates a simplified diagram of a network 60 in which another exemplary embodiment of the present invention may be employed. Network 60 is similar to network 10 shown in FIG. 1, except that it includes an enhanced call control system 62. Enhanced call control system 62 uses a legacy functionality 64 to control MSC/VLR 18, or other switching system, via a legacy signaling system, such as SS7 or IS-41. Legacy functionality 64 also has access to a database 29 of subscriber service profiles.

Running on enhanced call control system 62 as an application is an interface engine 66. Interface engine 66 is communicatively connected to packet-switched network 64 and to legacy functionality 64. Interface engine 66 communicates, as an SIP proxy server, with SIP server 36, via packet-switched network 16, using the SIP protocol. Interface engine 66 may also communicate with SIP service database 36 and network identity register 38, via packet-switched network 16. However, interface engine 66 communicates with legacy functionality 64 using a legacy signaling system, such as SS7 or IS-41.

2. Exemplary Operation

Figure 4:
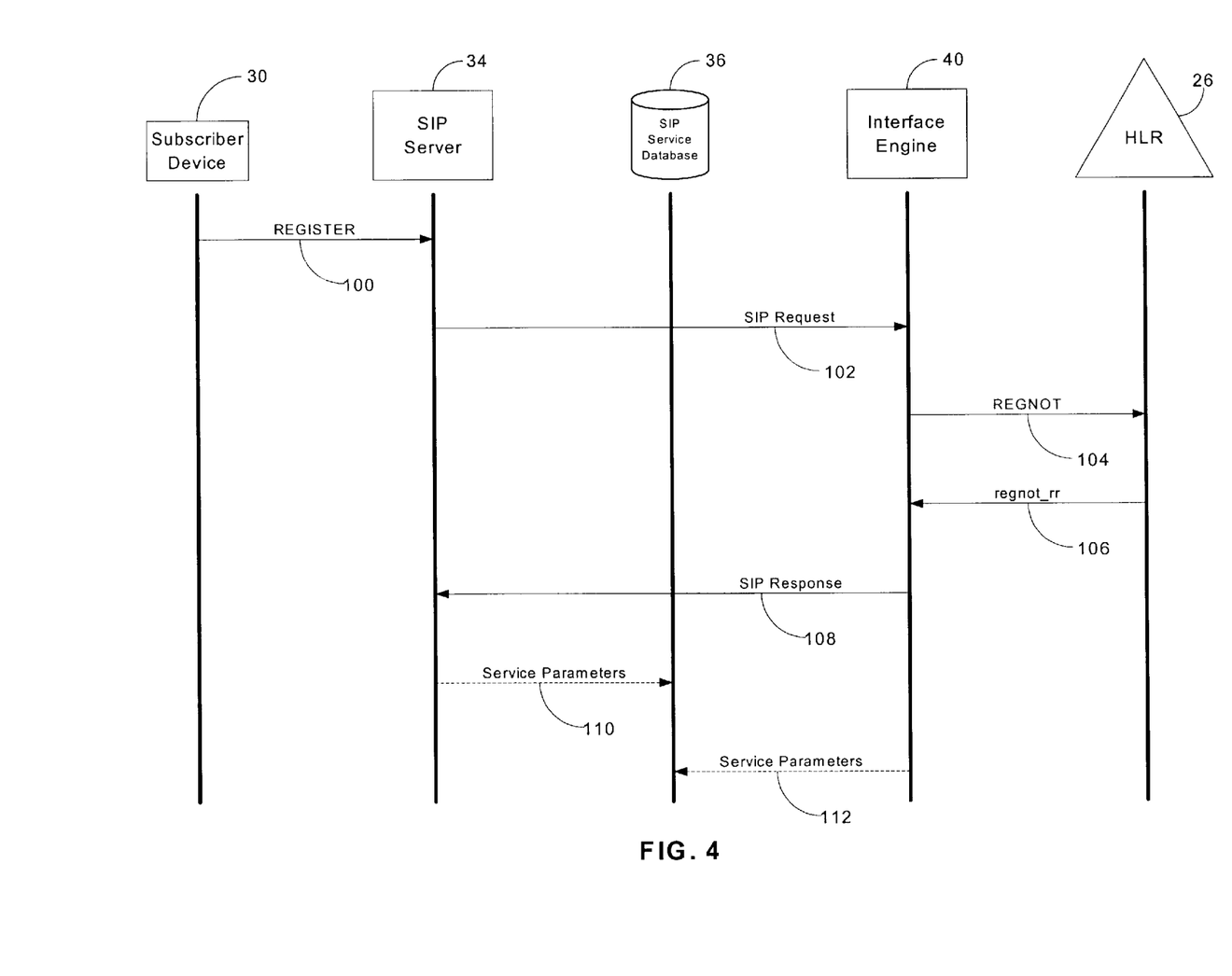
FIG. 4 is a simplified call flow diagram illustrating a process for obtaining and storing service parameters for a subscriber device, in accordance with an exemplary embodiment of the present invention.

FIG. 4 is a simplified call flow diagram showing exemplary signaling for when a subscriber device, such as subscriber device 30, registers with SIP server 34, in accordance with the exemplary architecture of FIG. 1. Subscriber device 30 sends an SIP REGISTER request 100, via packet-switched network 16, to SIP server 34. REGISTER request 100 typically includes information identifying the subscriber associated with subscriber device 30, such as a network address identifier (NAI). SIP server 34 responsively attempts to obtain the service profile for the subscriber. In this case, the service profile is in database 29. Thus, SIP server 34 sends a SIP request 102, via packet-switched network 16, to interface engine 40. SIP request 102 also includes information, such as a NAI, identifying the subscriber associated with subscriber device 30. Interface engine 40 responsively sends an IS-41 REGNOT message 104 to HLR 26. REGNOT message 104 includes information identifying the subscriber associated with subscriber device 30. The identifying information may include the mobile identification number (MIN) and electronic serial number (ESN) of device 30, in which case interface engine 40 preferably determines the MIN and ESN based on the NAI or other information contained in SIP request 102 identifying subscriber device 30. To facilitate this process, network identify register 38 may be provided with information regarding which MINs and ESNs are associated with which NAIs. Thus, interface engine 40 may query network identity register 38 to obtain the MIN and ESN for subscriber device 30, based on its NAI.

HLR 26 uses the identifying information in REGNOT message 104 to obtain from database 29 the service profile for the subscriber associated with subscriber device 30, and HLR 26 transmits the service profile to interface engine 40 in an IS-41 regnot_rr message 106. HLR 26 also updates this service profile with a locator address corresponding to interface engine 40, as if interface engine 40 were the MSC/VLR serving subscriber device 30.

The service profile includes various parameters that define, at least in part, what services are available to subscriber device 30. IS-41 standards define typical service profile parameters. HLR 26 uses these service profile parameters to determine what services to provide to devices operating in the wireless coverage area of network 12. As a result, these service profile parameters conform to the requirements of HLR 26, which, in turn, are based on the IS-41 specification and on the service logic used by HLR 26 to provide the services. SIP server 34, however, uses SIP signaling and may use different service logic. Thus, SIP server 34 may use a different set of parameters, or parameters in a different format, to provide services to subscriber devices connected to packet-switched network 16. As a result, part of the process of SIP server 34 obtaining service profile information for subscriber device 30 may include parsing the service profile, extracting the service parameters therefrom, and translating or reformatting the extracted service parameters into a form used by SIP server 34. These steps may be accomplished in various ways, as described in more detail below.

In a preferred approach, when interface engine 40 receives the service profile in message 106, it forwards the service profile in substantially the same form in a SIP response 108 to SIP server 34, via packet-switched network 16. SIP server 34 parses the service profile and extracts the service profile parameters. SIP server 34 then typically sends to SIP service database 36 the service profile parameters, and information identifying the corresponding subscriber, in a service parameter message 110. SIP server 34 may also translate or reformat the service parameters it extracts from the service profile to provide service parameters in a predetermined format before sending them to SIP service database 36 in message 110.

In another approach, interface engine 40 may parse the service profile and extract the service profile parameters. Interface engine 40 may also translate or reformat the extracted service profile parameters to provide service parameters in a predetermined format. Then, in this approach, interface engine 40 includes the properly formatted service parameters in SIP response 108 that it sends to SIP server 34. SIP server 34, in turn, forwards the service parameters to SIP service database in message 110. It is also possible for interface engine 40 to send the properly formatted service parameters directly to SIP service database 36 in a message 112.

In general, the process of extracting the service profile parameters from the service profile obtained from HLR 26, and, optionally, translating and reformatting the service parameters into a predetermined format, may be done by any of interface engine 40, SIP server 34, or SIP server 36, or by a combination of the foregoing.

Figure 5:
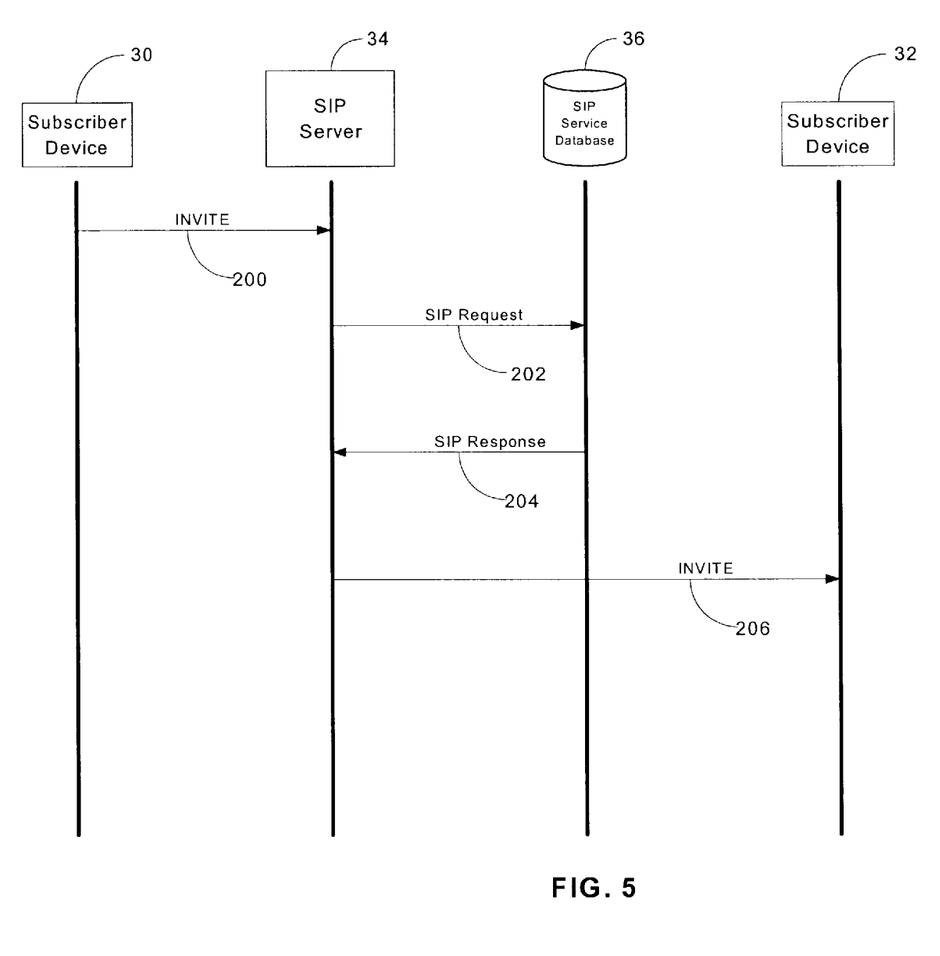
FIG. 5 is a simplified call flow diagram illustrating a process for setting up a session between subscriber devices, in accordance with an exemplary embodiment of the present invention.

Once a subscriber device has registered with SIP server 34, as described above, SIP server 34 will typically refer to the service parameters stored in SIP service database 36 to determine what services to apply in calls involving that subscriber device. For example, FIG. 5 illustrates a simplified call flow for the case of subscriber device 30 inviting a call a call to subscriber device 32. In accordance with the SIP protocol, subscriber device 30 sends an INVITE message 200 to SIP server 34, via packet-switched network 16. Message 200 identifies subscriber device 30 as the caller and subscriber device 32 as the destination, such as be specifying the respective NAIs of devices 30 and 32. If subscriber devices 30 and 32 have both previously registered with SIP server 34, then SIP server 34 sends to SIP service database 36 a SIP request message 202 that identifies subscriber devices 30 and 32 in order to obtain the service parameters for these subscribers. SIP service database 36 then sends back to SIP server 34 the service parameters for subscriber devices 30 and 32 in a SIP response message 204.

SIP server 34 determines from these service parameters what services to apply. More particularly, SIP server 34 determines what call origination services may be applicable for subscriber device 30, such as whether it is authorized to make the call, and what call termination services, such as call termination screening, may be applicable for subscriber device 32. SIP server 34 then applies any applicable call origination or call termination services. In simple cases, wherein SIP server 34 determine that the call can go through as requested, SIP server 34 sends an INVITE message 206 to subscriber device 32, in accordance with the SIP protocol.

To apply call origination or call termination services, SIP server 34 may execute its own service logic. Alternatively, SIP server 34 may rely on service logic executed by other systems, such as call control system 26. This approach may be accomplished by SIP server 34 causing interface engine 40 to send to call control system 26 an internetwork query containing the parameters needed to provide the implicated service. Call control system 26 would then run its service logic to obtain response parameters and transmit those response parameters to SIP server 34 in an internetwork response. SIP server 34 would then apply the service based on the response parameters.

Figure 6:
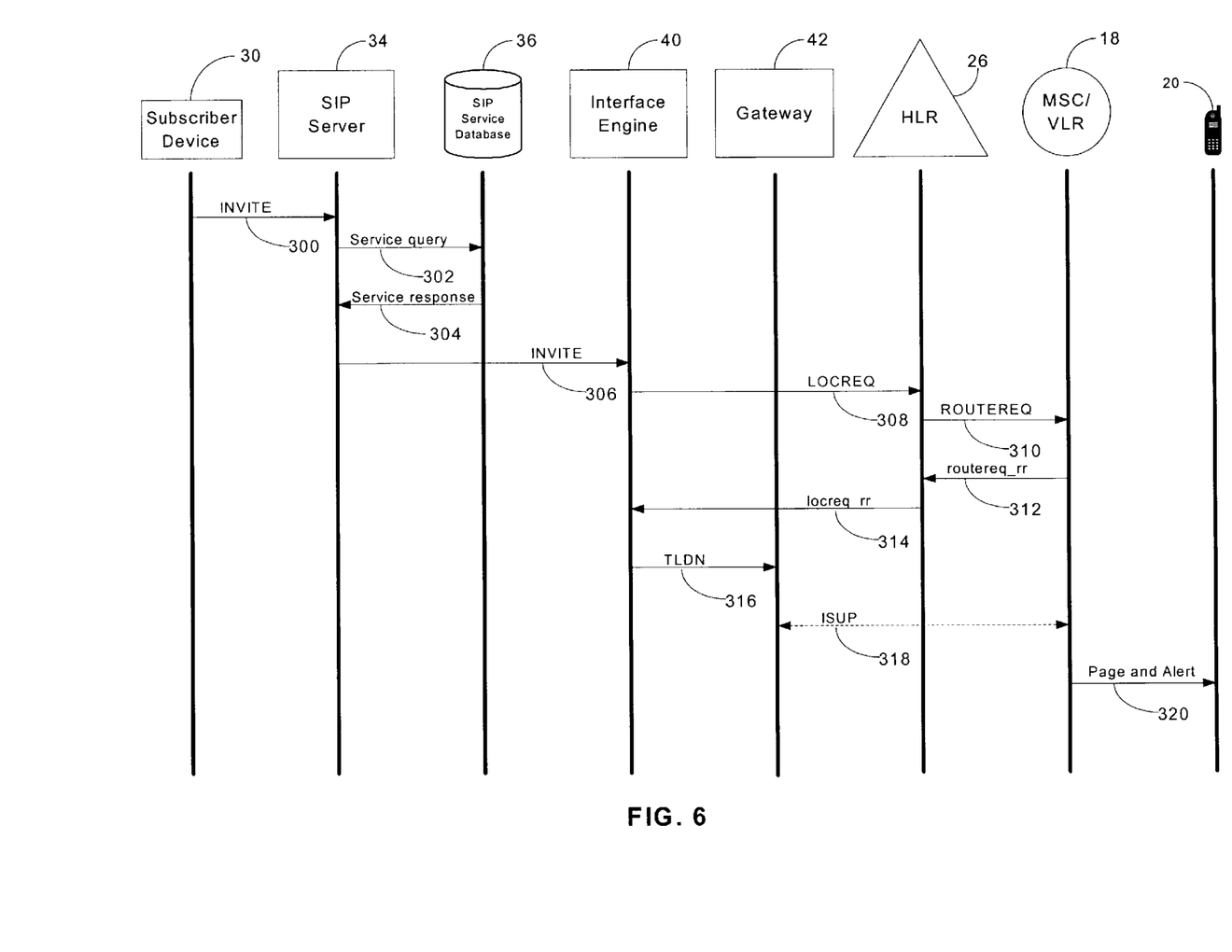
FIG. 6 is a simplified call flow diagram illustrating a process for setting up a call from a subscriber device in communication with a packet-switched network to a mobile station in communication with a wireless network, in accordance with an exemplary embodiment of the present invention.

Interface engine 40 may also be used to set up calls between subscriber devices that have registered with SIP server 34 and are connected to packet-switched network 16, such as subscriber device 30, and mobile stations operating in the wireless coverage area of network 12, such as mobile station 20. For example, FIG. 6 illustrates a simplified call flow for the case of subscriber device 30 calling mobile station 20. Subscriber device 30 sends an INVITE message 300 to SIP server 34, via packet-switched network 16. Message 300 identifies subscriber device 30 as the caller and mobile station 20 as the destination, such as by specifying NAIs for subscriber device 30 and mobile station 20. SIP server 34 sends a service query message 302 to SIP service database 34 to obtain the service parameters, and database 34 sends back the service parameters for subscriber device 30 in a service response message 304.

In this case, SIP server 34 determines that it must forward to interface engine 40 the INVITE it received in order to reach mobile station 20. For example, SIP server 34 may determine from the information identifying mobile station 20 in message 300 that mobile station 20 is not registered with SIP server 34. Accordingly, SIP server 34 sends an INVITE message 306 to interface engine 40, wherein message 306 identifies, such as by using NAIs, subscriber device 30 as the caller and mobile station 20 as the destination. Interface engine 40 then engages in IS-41 signaling to set up the call to mobile station 20. In particular, interface engine 40 sends to HLR 26 an IS-41 LOCREQ message 308 that identifies mobile station 20, typically by its MIN. As described above, interface engine 40 may query network identity register 38 to obtain the MIN for mobile station 20 based on the destination NAI included in message 306. HLR 26 then determines from the most recent registration of mobile station 20 with network 12 that it is accessible via MSC/VLR 18. As a result, HLR 26 sends an IS-41 ROUTEREQ message 310 to MSC/VLR 18. MSC/VLR 18 then replies by sending back to HLR 26 an IS-41 routereq_rr message 312 that includes a temporary location directory number (TLDN) for mobile station 20. HLR responsively forwards the TLDN to interface engine 40 in an IS-41 locreq_rr message 314.

As noted above with reference to FIG. 1, a gateway 42 is typically used to translate the media transferred in calls in network 10 between the packet-switched format used in packet switched network 16 and the circuit-switched format used in PSTN 14. Accordingly, interface engine 40 sends the TLDN to gateway 42 in a message 316, which may be a MGCP or SS7 Integrated Services User Part ("ISUP") message. Gateway 42 then routes the call, via PSTN 14, to this TLDN, which, in this case, corresponds to MSC/VLR 18. To accomplish this call routing, gateway 42 may, for example, exchange ISUP messages 318 with MSC/VLR 18. MSC/VLR 18 then causes page and alert signaling 320 to be sent to mobile station 20 via an air interface. When mobile station 20 answers, a path for exchanging voice or other media is established between subscriber device 30 mobile station 20.

Figure 7:
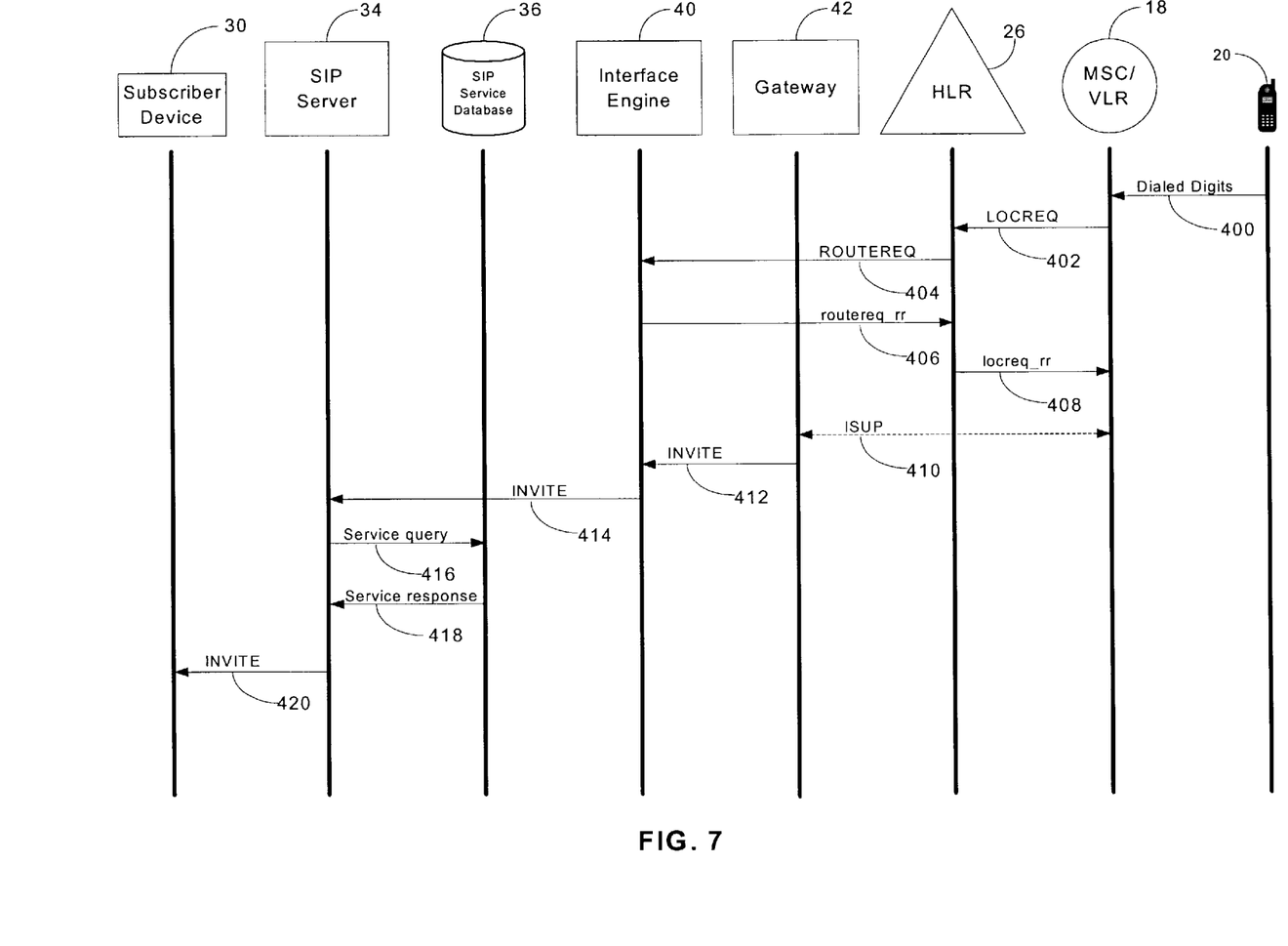
FIG. 7 is a simplified call flow diagram illustrating a process for setting up a call from a mobile station in communication with a wireless network to a subscriber device in communication with a packet-switched network, in accordance with an exemplary embodiment of the present invention.

FIG. 7 shows a simplified call flow for the case of mobile station 20 initiating a call to subscriber device 30. The user of mobile station 20 dials a number corresponding to subscriber device 30, and mobile station 20 transmits a signal 400 containing the dialed digits. MSC/VLR 18 receives the dialed digits and sends a LOCREQ message 402 to HLR 26. LOCREQ message 402 identifies subscriber device 30 as the destination. HLR 26 obtains the service profile for subscriber device 30 and finds a locator address corresponding to interface engine 40, all of which was updated when subscriber device 30 registered in accordance with the exemplary call flow of FIG. 4. Accordingly, HLR 26 sends an IS-41 ROUTEREQ message 404 to interface engine 40. Interface engine 40 responsively sends back to HLR 26 an IS-41 routereq_rr message 406 that includes a TLDN. In this case, the TLDN corresponds to a directory number allocated to gateway 42. Interface engine 40 may query a route engine or other server to obtain this TLDN. HLR 26 then forwards the TLDN to MSC/VLR 18 in a locreq_rr message 408. In response, MSC/VLR 18 engages in ISUP signaling 410 with gateway 42 to route the call to the TLDN via PSTN 14.

Gateway 42 then uses the SIP protocol to set up the call through packet-switched network 16. For example, gateway 42 may send to interface engine 40 an INVITE message 412 identifying gateway 42 as the caller and subscriber device 30 as the destination. Interface engine 40 forwards the information in an INVITE message 414 to SIP server 34. In response, SIP server 34 sends a service query message 416 to SIP service database 36, and SIP service database 36 sends back the service parameters for subscriber device 30 in a service response message 418. SIP server 34 determines from the service parameters what services to apply. If SIP server 34 determines that the call should go through, it sends an INVITE message to subscriber device 30. When subscriber device 30 answers the call, a media pathway between subscriber device 30 and mobile station 20 is established.

Figure 8:
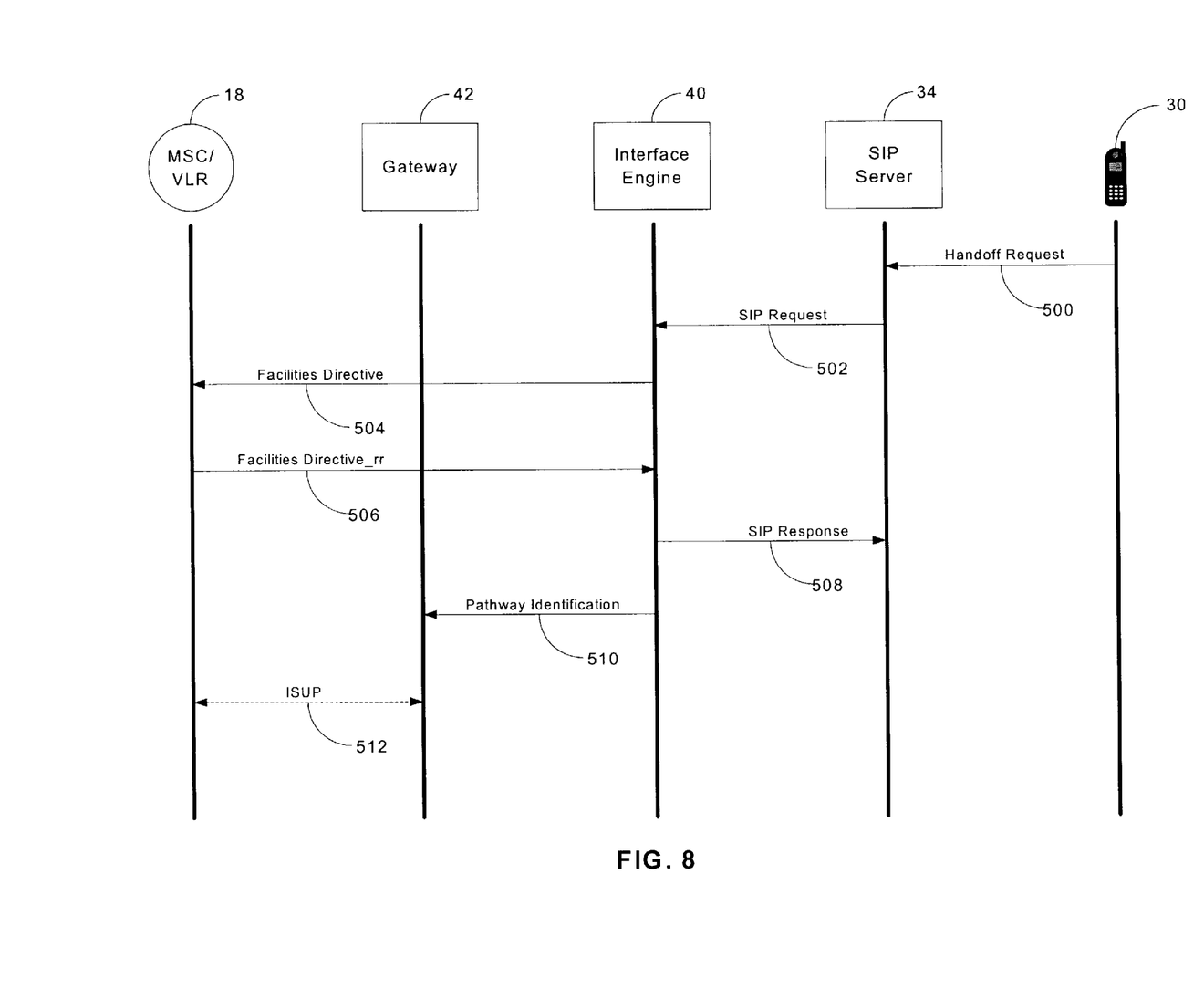
FIG. 8 is a simplified call flow diagram illustrating a process for handing off a subscriber device from a packet-switched network to a circuit-switched network, in accordance with an exemplary embodiment of the present invention.

Exemplary embodiments may also enable hand-offs between packet-switched network 16 and legacy circuit-switched network 12. FIG. 8 shows a simplified call flow for the case of subscriber device 30, in communication with packet-switched network 16, being handed off to circuit-switched network 12. For example, the wireless coverage areas of BTS 22 and radio access system 33 may overlap, and subscriber device 30, initially in wireless communication with radio access system 33, may be moving toward BTS 22 such that initiating wireless communication with BTS 22 may be desirable.

The process may be initiated by subscriber device 30, as shown in FIG. 8. For example, subscriber device 30 may measure the signal strength of a pilot channel of BTS 22 as being sufficiently high for communication. Subscriber device 30 may then transmit a handoff request 500 requesting communication on one of the channels of BTS 22. In response to handoff request 500, SIP server 34 then sends a SIP request 502 to interface engine 40 to request a handoff to MSC/VLR 18. In other cases, SIP server 34, rather than subscriber device 30, may initiate the handoff process.

In response to SIP request 502, interface engine 40 transmits an IS-41 Facilities Directive message 504 to MSC/VLR 18 to request a handoff. Message 504 specifies a circuit-switched communication pathway between MSC/VLR 18 and gateway 42, such as a trunk in a dedicated trunk group. To accept the handoff to the requested channel, MSC/VLR 18 transmits an IS-41 Facilities Directive Return Result message 506 to interface engine 40. Interface engine 40 transmits an SIP response message 508 to SIP server 34 indicating that MSC/VLR 18 has accepted the requested handoff.

Preferably, a voice path is then established between packet-switched network 16 and MSC/VLR 18, to prevent calls from being dropped. This may be accomplished by interface engine 40 sending to gateway 42 a pathway identification message 510 that identifies the communication pathway between MSC/VLR 18 and gateway 42 specified in message 504. Gateway 42 and MSC/VLR 18 then complete the voice path between them by exchanging ISUP messages 512.

Figure 9:
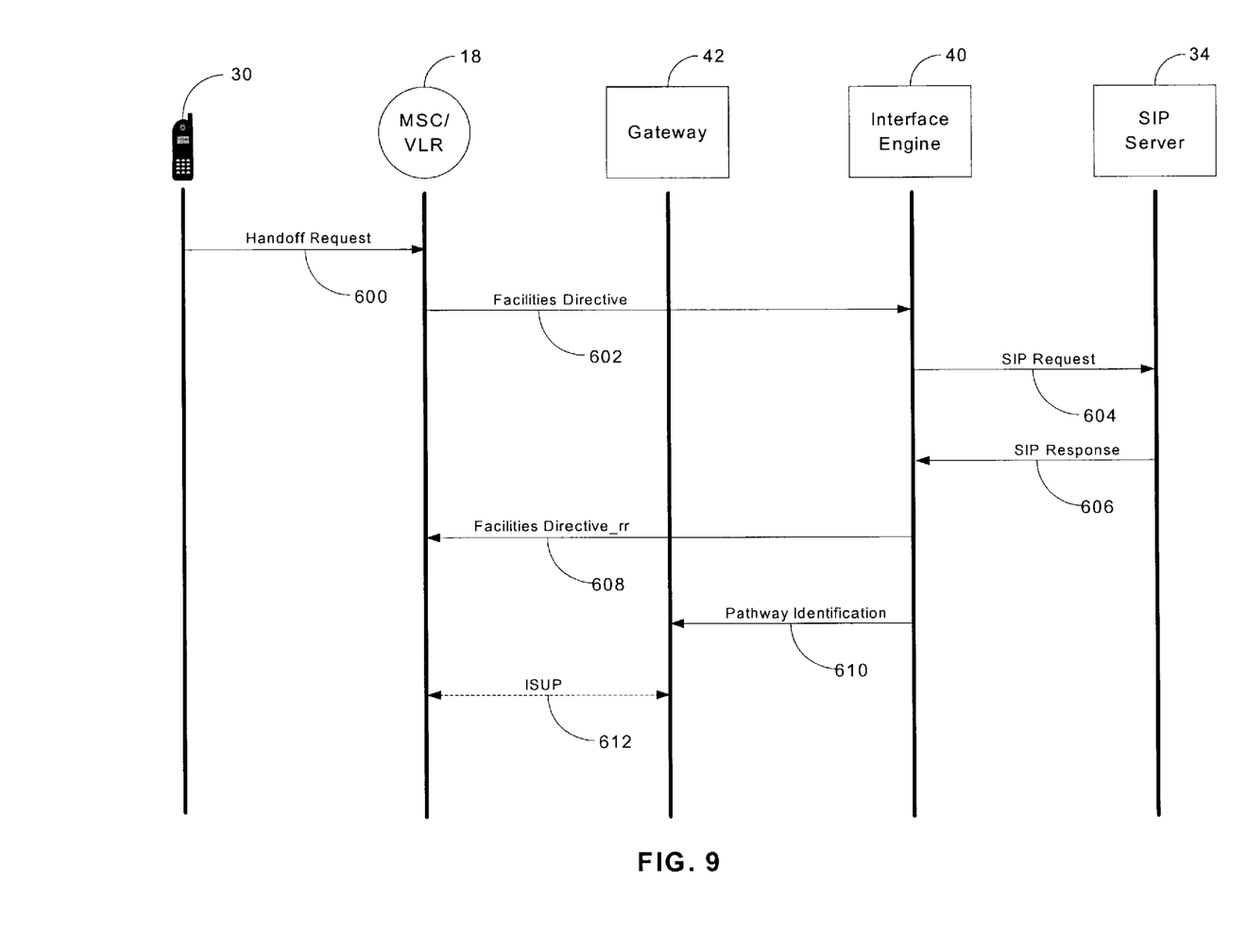
FIG. 9 is a simplified call flow diagram illustrating a process for handing off a subscriber device from a circuit-switched network to a packet-switched network, in accordance with an exemplary embodiment of the present invention.

FIG. 9 shows a simplified call flow for the case of subscriber device 30 being handed off from circuit-switched network 12 to packet-switched network 16. For example, subscriber device 30 may initially be in wireless communication with BTS 22 and may end up in wireless communication with radio access system 33. The process typically begins when subscriber device 30 transmits a handoff request message 600, requesting a handoff to one of the channels of radio access system 33. In response to handoff request message 600, MSC/VLR 18 transmits an IS-41 Facilities Directive message 602 to interface engine 40. Message 602 specifies a circuit-switched communication pathway between MSC/VLR 18 and gateway 42, such as a trunk in a dedicated trunk group. Interface engine 40 forwards the information to SIP server 34 in a SIP request message 604. SIP server 606 returns a SIP response message 606 to accept the requested handoff. Interface engine 40 then transmits to MSC/VLR 18 an IS-41 Facilities Directive Return Result message 608 indicating that the requested handoff is accepted. Interface engine 40 also sends to gateway 42 a pathway identification message 610 that identifies the communication pathway between MSC/VLR 18 and gateway 42 specified in message 602. MSC/VLR 18 and gateway 42 then exchange ISUP messages 610 to set up a voice path between them.

Although the call flows of FIGS. 4–9 presume the architecture of network 10 shown in FIG. 1, similar call flows may be used for the architectures of networks 50 and 60 shown in FIGS. 2 and 3, respectively.

3. Conclusion

The exemplary embodiments described herein beneficially enable services available on a legacy circuit-switches network to be extended to a packet-switched network by making available to the packet-switched network the service profile used in the legacy circuit-switched network. Moreover, the exemplary embodiments may enable hand-offs between the packet-switched network and the legacy circuit-switched network.

Exemplary embodiments of the present invention have been illustrated and described. It will be understood, however, that changes and modifications may be made to the invention without deviating from the spirit and scope of the invention, as defined by the following claims.

We claim:

1. A method of interfacing a circuit-switched network with a packet-switched network, said method comprising the steps of:

receiving a registration message indicating a subscriber is connected to said packet-switched network;

in response to said registration message, sending a request message to a call control system of said circuit-switched network, said request message identifying said subscriber;

receiving from said call control system a response message, said response message including service profile information for said subscriber; and storing in a service database of said packet-switched network at least one service parameter derived from said service profile information.

2. The method of claim 1, wherein said call control system is a home location register (HLR).

3. The method of claim 1, wherein said call control system is a legacy functionality of a home location register (HLR).

4. The method of claim 1, wherein said call control system is a service control point (SCP).

5. The method of claim 1, further comprising the steps of:

parsing said service profile information; and extracting at least one service parameter from said service profile information.

6. The method of claim 5, further comprising the step of:

translating said at least one service parameter to provide at least one service parameter in a predetermined format.

7. The method of claim 6, wherein said step of storing in a service database of said packet-switched network at least one service parameter derived from said service profile information comprises the step of storing said at least one service parameter in said predetermined format.

8. The method of claim 1, further comprising the step of using said at least one service parameter derived from said service profile information to apply a service for said subscriber.

9. A method of interfacing a legacy network with a Session Initiation Protocol (SIP) network, said method comprising the steps of:

receiving a registration message indicating presence of a subscriber in a SIP network;

in response to said registration message, sending a request message to a call control system of said network, said request message identifying said subscriber;

receiving from said call control system a response message, said response message including service profile information for said subscriber; and storing in a SIP service database at least one service parameter derived from said service profile information.

10. The method of claim 9, wherein said call control system is a home location register (HLR).

11. The method of claim 9, wherein said call control system is a legacy functionality of a home location register (HLR).

12. The method of claim 9, wherein said call control system is a service control point (SCP).

13. The method of claim 9, further comprising the steps of:

parsing said service profile information; and extracting at least one service parameter from said service profile information.

14. The method of claim 13, further comprising the step of:

translating said at least one service parameter to provide at least one service parameter in a predetermined format.

15. The method of claim 14, wherein said step of storing in a service database of said packet-switched network at least one service parameter derived from said service profile information comprises the step of storing said at least one service parameter in said predetermined format.

16. The method of claim 9, further comprising the step of using said at least one service parameter derived from said service profile information to apply a service for said subscriber.

17. A system for interfacing a circuit-switched network with a packet-switched network, said circuit-switched network including a call control system, said system comprising:

an interface engine, said interface engine sending a request message to a call control system of said circuit-switched network in response to a registration message, said request message identifying said subscriber, said registration message indicating a subscriber is connected to said packet-switched network.

18. The system of claim 17, wherein said packet-switched network includes a service database, and wherein said interface engine stores in said service database at least one service parameter in a predetermined format, said at least one service parameter in said predetermined format being derived from service profile information from said call control system.

19. The system of claim 18, wherein said interface engine extracts at least one service parameter from said service profile information.

20. The system of claim 19, wherein said interface engine translates said at least one service parameter into said at least one service parameter in said predetermined format.

21. The system of claim 17, wherein said packet-switched network includes a SIP server, and wherein said interface engine is an application run on said SIP server.

22. The system of claim 17 wherein said interface engine is an application run a service control point (SCP).

23. The system of claim 17, wherein said circuit-switched network includes a home location register (HLR), and wherein said interface engine is an application run on said HLR.

* * * * *